G. VICKERS.
Driving-Chain.

No. 215,997.  Patented May 27, 1879.

Witnesses.
F. L. Ourand
Alexander Mahon

Inventor.
George Vickers,
by A. M. Smith
Attorney.

UNITED STATES PATENT OFFICE.

GEORGE VICKERS, OF AUBURN, NEW YORK, ASSIGNOR TO D. M. OSBORNE, OF SAME PLACE.

IMPROVEMENT IN DRIVING-CHAINS.

Specification forming part of Letters Patent No. 215,997, dated May 27, 1879; application filed April 25, 1879.

*To all whom it may concern:*

Be it known that I, GEORGE VICKERS, of Auburn, county of Cayuga, State of New York, have invented certain new and useful Improvements in Driving-Chains, of which the following is a full, clear, and exact description, reference being had to the accompanying drawings, making part of this specification, in which—

Figure 1:
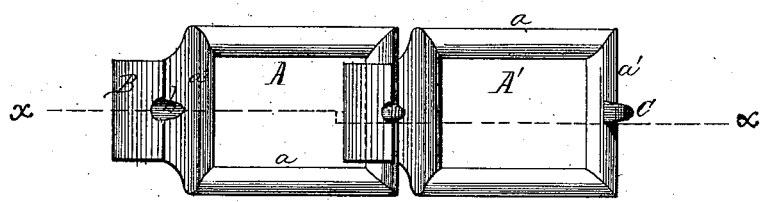
Figure 2:
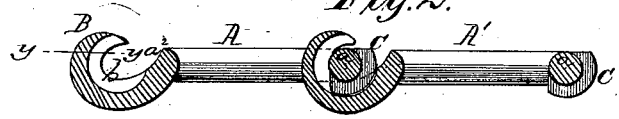
Figure 3:
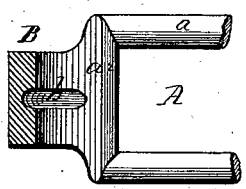

Figure 1 is a plan view, showing two of the links of my improved driving-chain. Fig. 2 represents a longitudinal section through the same, taken on line $x\ x$, Fig. 1; and Fig. 3 represents a section through one of the open hooks, taken on line $y\ y$, Fig. 2.

Similar letters of reference denote corresponding parts wherever used.

The invention relates to a novel construction of the end bars and coupling-hooks of a driving-chain for facilitating their addition to or removal from the chain, for the purpose of lengthening or shortening it, as required; and consists in providing the outer end of the inner face of the open hook with a groove or recess for the reception of a partial collar on the end bar of the adjacent link, arranged to permit the insertion or withdrawal of the end bar when the links are brought to an acute angle, but effectually preventing the withdrawal of said end bar when the links are made to approach a working relation to each other, as hereinafter described.

In the ordinary construction of driving-chains adapted, by means of open hooks and detachable links, to be lengthened and shortened, as required, it has been usual to form a notch or recess in the side or end bars, and at points which tended to reduce the strength of the links at points where the greatest strain is exerted, and where, consequently, the greatest strength is required, thereby resulting in frequent and annoying breakage of the links, and the stopping and loss of time in the use of the machinery operated thereby.

The object of the present improvement is to remedy this difficulty by avoiding any reduction in the size of the bars of the links at all points where great strain comes in the practical use of the chain.

In the accompanying drawings, A A' represent two open links, having side bars, $a$, end bars, $a^1$, and open hooks B, made in any usual or preferred form, except in details hereinafter described.

The end bars, $a^1$, are, by preference, made in the cylindrical form indicated in Fig. 2, as it forms the journal upon which the hook turns; but all recessing or reduction in size of said end bar, or of the side bars, is avoided, and the full size and strength of said bars is preserved throughout, and the hook B is open sufficiently wide to permit the ready insertion and withdrawal of said cylindrical end bar.

For the purpose of retaining the bar $a^1$ in the hook B, except when the links are brought to an acute angle to permit its insertion or withdrawal, the bar $a^1$ has a partial collar, C, formed upon it midway of its length, and the hook B, at its outer end, removed from the end bar or base, $a^2$, of the hook, has a longitudinal groove or recess, $b$, extending outward to its point or free end.

By this arrangement of the groove, the full weight and strength of the metal at the base or junction of the hook with the link are preserved.

The partial collar C extends about two-fifths (more or less) of the circumference of the end bar, $a^1$, and is upon the outer and lower side of the bar $a^1$, in such relation thereto that when the links are brought to an acute angle of relation to each other for coupling or uncoupling them, the collar is on the side adjacent to the free end of the hook, and in this position the collar enters the groove $b$, and permits the end bar, $a^1$, to enter or be withdrawn from the hooks, as desired.

As the links are turned down or away from each other toward the relation they assume when the chain is in use, the collar C moves in contact with the inner end wall of said groove, and forces the bar $a^1$ under the end of the hook, effectually preventing its withdrawal until the links are again brought to an acute angle, as before. The collar remains in the groove, and effectually prevents lateral play of the links relatively to each other, thereby maintaining them in effective working relation to each other.

Having now described my invention, what I claim as new, and desire to secure by Letters Patent, is—

The links A, provided with the grooved or recessed open hooks B, and the end bars, $a^1$, having the spur or partial collars C, substantially as and for the purpose specified.

GEORGE VICKERS.

Witnesses:
C. W. UPHAM,
CARL OHLMEYER.